(12) United States Patent
Faust

(10) Patent No.: US 9,353,019 B2
(45) Date of Patent: May 31, 2016

(54) COATED SEEDS

(71) Applicant: OMS Investments, Inc., Los Angeles, CA (US)

(72) Inventor: Michael Faust, Marysville, OH (US)

(73) Assignee: OMS Investments, Inc., Los Angeles, CA (US)

( * ) Notice: Subject to any disclaimer, the term of this patent is extended or adjusted under 35 U.S.C. 154(b) by 0 days.

(21) Appl. No.: 14/158,424

(22) Filed: Jan. 17, 2014

(65) Prior Publication Data

US 2014/0206535 A1    Jul. 24, 2014

Related U.S. Application Data

(60) Provisional application No. 61/754,511, filed on Jan. 18, 2013.

(51) Int. Cl.
| | |
|---|---|
| *C05G 3/00* | (2006.01) |
| *C05G 3/02* | (2006.01) |
| *C05B 15/00* | (2006.01) |
| *A01C 1/06* | (2006.01) |

(52) U.S. Cl.
CPC ... *C05G 3/00* (2013.01); *A01C 1/06* (2013.01); *C05B 15/00* (2013.01); *C05G 3/0029* (2013.01); *C05G 3/02* (2013.01)

(58) Field of Classification Search
CPC ...... C05G 3/00; C05G 3/0029; C05G 3/0041; A01C 1/06; C05B 15/00
See application file for complete search history.

(56) References Cited

U.S. PATENT DOCUMENTS

| | | | |
|---|---|---|---|
| 4,344,979 A | 8/1982 | Gago et al. | |
| 4,779,376 A | 10/1988 | Redenbaugh | |
| 5,632,799 A | 5/1997 | Behel, Jr. et al. | |
| 5,747,416 A * | 5/1998 | McArdle | A01N 25/10 504/115 |
| 5,792,855 A | 8/1998 | Yonemura et al. | |
| 5,799,439 A | 9/1998 | MacGregor | |
| 6,199,318 B1 | 3/2001 | Stewart et al. | |
| 6,209,259 B1 | 4/2001 | Madigan et al. | |
| 6,230,438 B1 | 5/2001 | Zaychuk et al. | |
| 6,329,324 B1 | 12/2001 | Brueggemann et al. | |
| 6,557,298 B2 | 5/2003 | Obert et al. | |
| 7,115,321 B2 | 10/2006 | Soerens et al. | |
| 7,213,367 B2 | 5/2007 | Wertz et al. | |
| 7,452,546 B2 | 11/2008 | Botts et al. | |
| 7,921,598 B2 | 4/2011 | Nishiyama | |
| 8,017,553 B2 | 9/2011 | Doane et al. | |

(Continued)

FOREIGN PATENT DOCUMENTS

| | | | | |
|---|---|---|---|---|
| CA | 2479614 A1 * | 10/2003 | | C05C 9/02 |
| CA | 2479614 A1 * | 10/2003 | | C05C 9/02 |

(Continued)

OTHER PUBLICATIONS

Klock et al., "Comparison of Bone Products for Phosphorus Availability", Jul./Sep. 1996; Hort Technology, 6(3):257-260.*

(Continued)

*Primary Examiner* — Jane C Oswecki
(74) *Attorney, Agent, or Firm* — Hunton & Williams LLP

(57) ABSTRACT

Embodiments of the present invention relate to seeds coated with a coating comprising (a) a water-swellable polymer; (b) one or more controlled-release fertilizers; (c) bone meal substantially free of protein; and (d) optionally one or more fungicides.

25 Claims, 4 Drawing Sheets

(56) References Cited

U.S. PATENT DOCUMENTS

| | | | |
|---|---|---|---|
| 8,932,383 B2 * | 1/2015 | Zhang | C05G 1/00 71/23 |
| 2008/0236037 A1 | 10/2008 | Rose et al. | |
| 2008/0287295 A1 | 11/2008 | Rubin | |
| 2009/0056213 A1 | 3/2009 | Van Paridon-Bakker et al. | |
| 2009/0163364 A1 | 6/2009 | Legro | |
| 2011/0094967 A1 | 4/2011 | Glienke | |
| 2011/0113983 A1 | 5/2011 | Bernu et al. | |
| 2013/0259582 A1 * | 10/2013 | Birthisel | C09K 17/42 405/263 |

FOREIGN PATENT DOCUMENTS

| | | | | |
|---|---|---|---|---|
| CN | 101774833 B | * | 5/2010 | C05F 11/08 |
| CN | 101774833 A | * | 7/2010 | C05F 11/08 |
| GB | 1 479 848 | | 7/1977 | |
| GB | 2 223 662 A | | 4/1990 | |
| GB | 2223662 A | * | 4/1990 | A01C 1/06 |
| GB | 2223662 A | * | 4/1990 | A01C 1/06 |
| WO | WO 85/01736 | | 4/1985 | |
| WO | WO 91/05459 | | 5/1991 | |
| WO | WO 99/57959 | | 11/1999 | |

OTHER PUBLICATIONS

Klock et al., "Comparison of Bone Products for Phosphorus Availability," Jul./Sep. 1996; Hort Technology, 6(3):257-260.*

"715.07 Facts and Documentary Evidence," MPEP, E_9-11.2013 Version; US Patent & Trademark Office [Retrieved Oct. 21, 2015].*

* cited by examiner

Sun and Shade Mix 28 days after planting

Heat Tolerance Study 28 days after planting 34 days after planting

COATED SEEDS

CROSS-REFERENCE TO RELATED APPLICATIONS

This application claims priority to U.S. Provisional Application No. 61/754,511, filed Jan. 18, 2013, the contents of which are hereby incorporated by reference in their entireties.

FIELD OF THE INVENTION

Embodiments of the present invention relate to coated seeds. In some embodiments, the seeds are coated with a coating comprising a water-swellable polymer; one or more controlled-release fertilizers; bone meal that is low in protein and fat content; and optionally one or more fungicides.

BACKGROUND OF THE INVENTION

Growing crops, grass, and other plants have long been treated with a variety of active chemical agents to impart to the plants desirable effects, such as enhanced growth characteristics or enhanced resistance to pests or diseases. Examples of such agents include fertilizers, herbicides, fungicides, insecticides, chemical hybridizing agents, auxins, and plant growth regulators. An important active agent that is often used to treat plants is phosphate, since it, among other things, promotes root growth. Sources of phosphate include synthetic sources (e.g., Super Phosphate 0-20-0 from The Espoma Co., Millville, N.J.) and non-synthetic sources, including bone meal or guano from a variety of sources.

SUMMARY OF THE INVENTION

In one embodiment, the invention relates to a seed comprising a coating, wherein said coating comprises (a) a water-swellable polymer; (b) one or more controlled-release fertilizers; (c) bone meal that is low in protein and fat content; and (d) optionally one or more fungicides.

In another embodiment, the invention relates to a method of coating a seed comprising:
 (a) coating seeds with a sticking agent; and
 (b) adding to the seeds with the sticking agent a coating comprising one or more controlled-release fertilizers; bone meal substantially free of protein; and one or more fungicides.

Other objects and advantages will become apparent to those skilled in the art from a consideration of the ensuing detailed descriptions set forth herein.

DETAILED DESCRIPTION OF THE INVENTION

Figure 1:
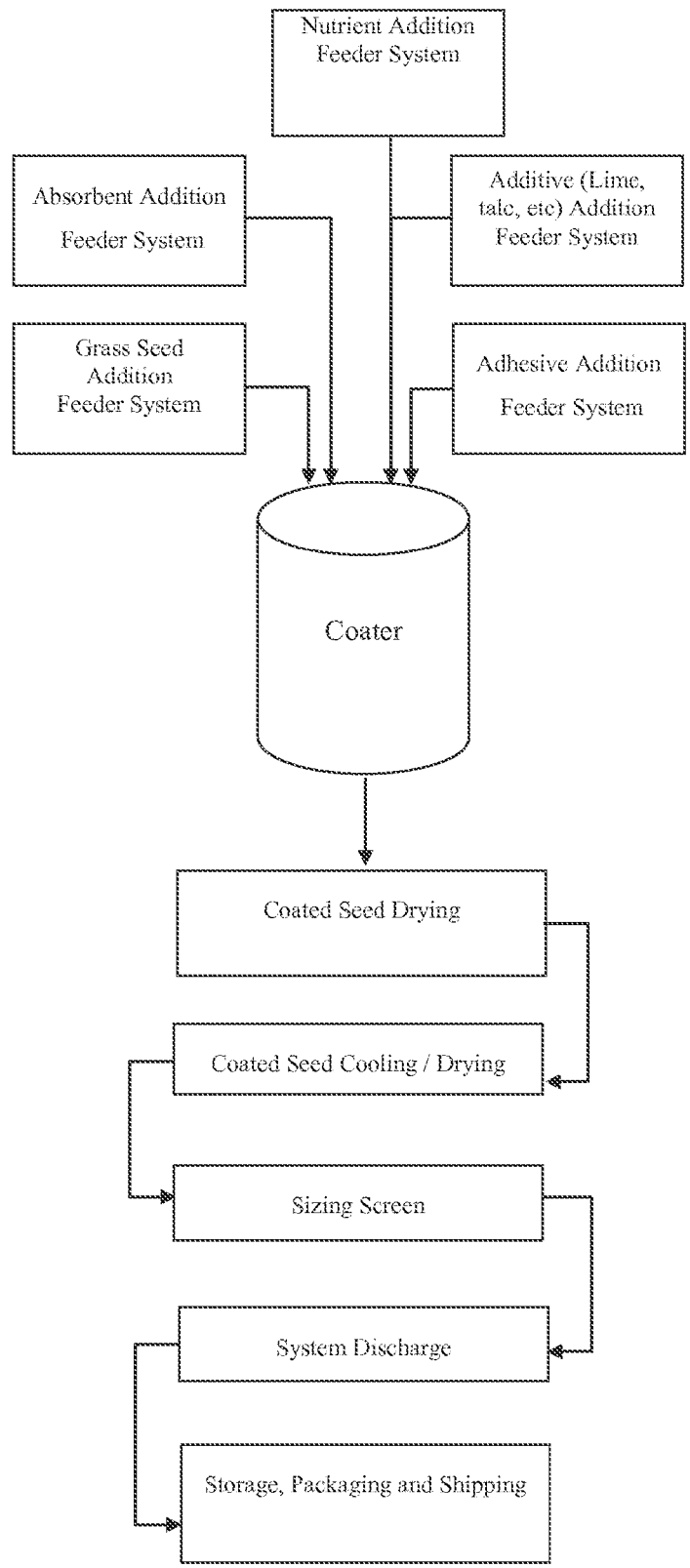
FIG. 1: A flow diagram demonstrating the manufacturing process.

The foregoing and other aspects of the present invention will now be described in more detail with respect to embodiments described herein. It should be appreciated that the invention can be embodied in different forms and should not be construed as limited to the embodiments set forth herein. Rather, these embodiments are provided so that this disclosure will convey the scope of the invention to those skilled in the art.

In one embodiment, the invention relates to a seed comprising a coating, wherein said coating comprises: (a) a water-swellable polymer; (b) one or more controlled-release fertilizers; (c) bone meal comprising low protein and fat content; and (d) optionally one or more fungicides.

As used herein the term "water-swellable polymer" includes, but is not limited to, a cross-linked polymer that swells without dissolving in the presence of water, absorbing at least 10 times its weight in water. It is believed that any water-swellable polymer can be effective in the embodiments of the present invention. While the water-swellable polymer may be a natural or a synthetic water-swellable polymer, synthetic water-swellable polymers can be particularly advantageous in terms of water absorptivity and water retention to help promote seed germination under conditions of reduced moisture (e.g., moisture stress). Synthetic water-swellable polymers are usually cross-linked polyacrylamides or cross-linked polyacrylates and have been reported to remain active for up to two years or more. Other examples of suitable water-swellable polymers include carrageenan, agar and alginic acid, and gellan gum. Further examples of water-swellable polymers include, but are not limited to those described in U.S. Pat. Nos. 4,779,376; 4,344,979; 5,632,799; and 8,017,553; and in Published PCT Appl. No. WO85/01736, all of which are incorporated by reference as if fully set forth herein. In some embodiments, water swellable polymers are starch or protein based polymers. In some embodiments, water-swellable polymers, as the term is used herein, are super absorbent polymers capable of absorbing from 10 to over 100, such as 50 or even 80 to over 100, times their weight in water. Some water-swellable polymers are able to absorb as much as 400 to 500 times their weight in water; others as much as 1,500 times their weight in water. In one embodiment, the water-swellable polymer comprises Zeba®. In other embodiments, the water-swellable polymer is Aridall® Superabsorbent Polymer (potassium polyacrylate); Aqualon Aquasorb® (sodium carboxymethylcellulose); Stockosorb®; Watersorb®; Zeba®; and the like and combinations thereof.

In some embodiments, the term "controlled-release fertilizer" includes, but is not limited to, fertilizers that are polymeric and the controlled-release nature of such fertilizers is derived from the fact that the polymeric fertilizer is broken down, over time, into smaller oligomers and/or into monomers. In some embodiments, the oligomers and/or monomers, in turn, serve as the ultimate fertilizer. In another embodiment, the fertilizer may be a urea formaldehyde-based fertilizer.

In some embodiments, the controlled-release fertilizer includes an IBDU compound of the general formula

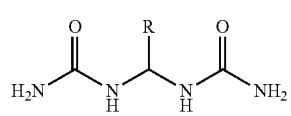

wherein R is hydrogen or alkyl. In some embodiments, R is alkyl.

As used herein, the term "alkyl" refers to monovalent saturated alkane radical group having up to about 11 carbon atoms, more particularly as a lower alkyl, from 1 to 8 carbon atoms and still more particularly, from 1 to 6 carbon atoms. The hydrocarbon chain may be either straight-chained or branched. This term is exemplified by groups such as methyl, ethyl, n-propyl, iso-propyl, n-butyl, iso-butyl, tert-butyl, n-hexyl, n-octyl, tert-octyl, and the like.

In some embodiments, the controlled-release polymer includes a methylene-urea polymer of the formula:

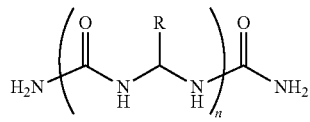

wherein R is hydrogen or alkyl and n is an integer from 2 to 10. In some embodiments, R is hydrogen.

In some embodiments, the fertilizer is an immediate release fertilizer, but is incorporated into a controlled-release composition that renders the fertilizer a controlled-release fertilizer. Such controlled release compositions include compositions comprising the immediate release fertilizer incorporated into a material that delays the release of the fertilizer into the surrounding environment and/or reduces the rate of release of the fertilizer into the surrounding environment. Materials that delay the release of the fertilizer include those described in McFarlane, et al., *Pesticide Science* 9:411-424 (1978); Controlled Delivery of Crop-Protection Agents, R. M. Wilkins, Ed., Taylor & Francis, London (1990); and Controlled-Release Delivery Systems for Pesticides, H. B. Scher, Ed., Marcel Dekker, Inc., New York, (1999).

As mentioned above, the seeds of the embodiments of the present invention comprise a coating that comprises bone meal having low protein and fat content. Without being bound by any paticular theory, it is believed that the use of such bone meal, comprising low protein and fat content, leads to fewer difficulties in processing (e.g., poor flow properties, caking and fouling of equipment). In some embodiments, the bone meal originates from livestock, including pigs and cows. In some embodiments the bone meal is preferably of porcine origin. As used herein, the bone meal comprises less than 15%, 14%, 13%, 12%, 11%, 10%, 9%, 8%, 7%, 6%, 5%, 4%, 3%, or 2% by weight protein (e.g., from meat left on the bone). In one embodiment, the bone meal comprises from about 8% to about 12% protein; in another embodiment, the bone meal comprises between about 9% to about 12%, 10% to about 12%, or 11% to about 12%; in another embodiment, the bone meal comprises about 10% protein. The bone meal also comprises less than 8%, 7%, 6%, 5%, 4%, 3%, or 2% by weight fat content. In one embodiment, the fat content is less than 5%. In one embodiment, the fat content is between 1.5% and 3.5%; in another embodiment, the bone meal comprises about 2.5% fat by weight. In some embodiments, the bone meal has an N-P-K analysis where the phosphorus ($P_2O_5$) content is at least 20%. In some embodiments, the bone meal has an N-P-K analysis where the phosphrus ($P_2O_5$) content is at least 22%. In some embodiments, the bone meal has an N-P-K analysis where the phosphrus ($P_2O_5$) content is at least 30%. In other embodiments, the bone meal has an N-P-K analysis of 1-30-0, or 1-22-0. Bone meal having a relatively high elemental analysis, in particular having a phosphorus content greater than 20%, permits a greater concentration of nutrient to be coated on and available to the seed. In another embodiment, the bone meal has a particle size of less than 106 microns.

The seeds of the embodiments of the present invention comprise a coating that also comprises a fungicide. Fungicides include, but are not limited to, aliphatic nitrogen fungicides (e.g., butylamine, cymoxanil, dodicin, dodine, guazatine, and iminoctadine); amide fungicides (e.g., carpropamid, chloraniformethan, and cyflufenamid); antibiotic fungicides (e.g., aureofungin, blasticidin-S, and cycloheximide); aromatic fungicides (e.g., biphenyl, chlorodinitronaphthalenes, and chloroneb); arsenical fungicides (e.g., asomate and urbacide); aryl phenyl ketone fungicides (e.g., metrafenone and pyriofenone); benzimidazole fungicides (e.g., albendazole, benomyl, and carbendazim); benzimidazole precursor fungicides (e.g., furophanate, thiophanate, and thiophanate-methyl); benzothiazole fungicides (e.g., bentaluron, benthiavalicarb, and benthiazole); botanical fungicides (e.g., allicin, berberine, and carvacrol); bridged diphenyl fungicides (e.g., bithionol, dichlorophen, and diphenylamine); carbamate fungicides (e.g., benthiavalicarb, furophanate, and iodocarb); and the like. See, e.g., http://www.alanwood.net/pesticides/class_fungicides.html, incorporated by reference as if fully set forth herein. In another embodiment, the fungicide may be a liquid, such as Apron XL®. In another embodiment, the fungicide may be a solid.

The seeds with which the present invention is useful can be of any species. In some embodiments, the seed is grass seed (e.g., perennial ryegrass, fine fescue, Kentucky bluegrass, tall fescue, bermudagrass, zoysiagrass, bahiagrass, centipedegrass or mixtures thereof). In some embodiments, the seeds are for plant species that are agronomically important. These plant species include, but are not limited to, corn, peanut, canola/rapeseed, soybean, curcubits, crucifers, cotton, rice, sorghum, sugar beet, wheat, barley, rye, sunflower, tomato, sugarcane, tobacco, oats, as well as other vegetable and leaf crops In one embodiment of the invention, the seed is transgenic. The transgenic seed on which the present invention is useful may be engineered to express a desirable characteristic and, in particular, may have at least one heterologous gene encoding for the expression of a protein that is, e.g., pesticidally active and has insecticidal activity.

Many techniques for applying coatings to seeds are known and may be used for coating the seeds of the embodiments of the present invention. Among the coating techniques that may be used include, but are not limited to, mixing in a container (e.g., a bottle or bag), mechanical application, tumbling, spraying, and immersion. The coating(s) of the embodiments of the present invention may be applied to the seeds using conventional coating techniques and machines, such as fluidized bed techniques, the roller mill method, rotostatic seed treaters, and drum coaters. Other methods, such as spouted beds may also be useful. In one embodiment, the seed is coated using a rotary or rotostatic coater. The seeds may be presized before coating. After coating, the seeds are typically dried and then transferred to a sizing machine for sizing.

An initial step is preparation of an aqueous solution of a sticking agent, such as polyvinyl alcohol, polyethylene glycol, aqueous polyvinyl acetate latex, polyvinyl pyrrolindone, methyl cellulose, hydroxylpropyl cellulose, dextrin, sugar, molasses, an alginate, karaya gum, jaguar gum, tragacanth gum, polysaccharide gum, natural glue, or mucilage or mixtures thereof. In some embodiments, the sticking agent can be only water. Seeds are then combined with the aqueous solution of the sticking agent such that the seeds are coated with the aqueous solution of the sticking agent. Those of skill in the art will appreciate that the seeds can be added to the aqueous solution of the sticking agent or the aqueous solution of the sticking agent can be added to the seeds. The coated seeds are subsequently treated with the water-swellable polymer; one or more controlled-release fertilizers; bone meal comprising low protein or fat content; and optionally one or more fungicides either in series or as a mixture of one or more of the aforementioned agents. In another embodiment, a fungicide or an additive (e.g., diatomaceous earth or perlite) may form an intermediate layer between the seed and the fertilizer.

The aqueous solution of the sticking agent may be applied to the seeds by any standard techniques for applying liquids to seeds. For example, the coating process can comprise spraying a composition comprising the sticking agent onto the seed while agitating the seed in an appropriate piece of equipment, such as a tumbler, a rotostat, a mixer, or a pan granulator.

While the particular water concentration of the wet mixture is not crucial, higher water concentrations mean more water must be removed later to produce a dry coating. Therefore, lower water concentrations are preferred, and generally only enough water to produce an adequate coating on the seeds.

Other additives, such as silicacous materials (e.g., diatomaceous earth or perlite), calcium carbonate, talc or combinations thereof may be added to the seeds coated with the aqueous solution of the sticking agent.

In one embodiment, when coating seed on a large scale (for example a commercial scale), seed may be introduced into the treatment equipment (such as a tumbler, a rotostat, a mixer, or a pan granulator) either by weight or by flow rate. The amount of treatment composition (e.g., the aqueous solution of the sticking agent) that is introduced into the treatment equipment can vary depending on the seed weight to be coated, surface area of the seed, the concentration of the active ingredient in the controlled release formulation, the desired concentration on the finished seed, and the like. The treatment composition (e.g., the aqueous solution of the sticking agent) can be applied to the seed by a variety of means, for example by a spray nozzle or revolving disc. As the seed falls into the treatment equipment the seed can be treated (e.g., by misting or spraying with the seed treatment composition) and passed through the treater under continual movement/tumbling where it can be coated evenly. Once coated with the aqueous solution of the sticking agent, the coated seeds are subsequently treated with the combination of an additive such as calcium carbonate, a water-swellable polymer; one or more controlled-release fertilizers; bone meal comprising low protein and fat content; and one or more fungicides either in series or as a mixture of one or more of the aforementioned agents; and dried before storage or use.

In another embodiment, a known weight of seeds can be introduced into the treatment equipment (e.g., a tumbler, a rotostat, a mixer, or a pan granulator). A known volume of seed treatment composition (e.g., the aqueous solution of the sticking agent) can be introduced into the treatment equipment at a rate that allows the seed treatment composition to be applied evenly over the seeds. During the application, the seed can be mixed, for example by spinning or tumbling. The seed can optionally be dried or partially dried during the tumbling operation. Once coated with the aqueous solution of the sticking agent, the coated seeds are subsequently treated with the combination of a water-swellable polymer; one or more controlled-release fertilizers; bone meal comprising low protein and fat content; and one or more fungicides either in series or as a mixture of one or more of the aforementioned agents; and dried before storage or use.

In still another embodiment, seeds can be coated in laboratory size commercial treatment equipment or in a narrowneck bottle or receptacle with a lid using methods well known in the art.

The coated seeds may be dried by conventional methods. For example, a desiccant or mild heat (e.g., at below about 40° C.) may be employed to produce a dry coating.

An alternative coating technique, involves two steps. The first step involves application of a "sticking agent" as an adhesive film over the seed so that the water-swellable polymer, as well as the one or more controlled-release fertilizers; bone meal comprising low protein and fat content; and one or more fungicides or a mixture of one or more of the aforementioned agents, in the form of a powder can be bonded to the seed to form the coating of the embodiments of the invention. The film may be a thin coating of wet water-swellable polymer. Alternatively, a quantity of seed can be mixed with a sticking agent, such as polyethylene glycol, polyvinyl alcohol or mixtures thereof, and optionally agitated to encourage uniform coating of the seed with the sticking agent. In the second step, the seed coated with the sticking agent can then be mixed with the powdered mixture of water-swellable polymer; one or more controlled-release fertilizers; bone meal comprising low protein and fat content; and optionally one or more fungicides either in series or as a mixture of one or more of the aforementioned agents. Other additives may also be added. The seed, water-swellable polymer; one or more controlled-release fertilizers; bone meal comprising low protein and fat content; and optinally one or more fungicides can be agitated, for example, by tumbling, to encourage contact of the sticking agent with the powdered material, thereby causing the powdered material to stick to the seed.

The embodiments of the present invention contemplate the application to a seed of a coating comprising (a) a water-swellable polymer; (b) one or more controlled-release fertilizers; (c) bone meal comprising low protein and fat content; and (d) optionally one or more fungicides. Those of skill in the art can determine the relative proportions of water-swellable polymer; one or more controlled-release fertilizers; bone meal comprising low protein and fat content; and optionally one or more fungicides and the thickness of the coating. In one embodiment, the coating is approximately double the weight of the raw seed. In another embodiment, the coating is approximately 34 to 52% of the weight of the seed. In one embodiment, the coating weight applied onto the seed is approximately 60%, 50%, 40%, 30%, 20%, or 10% of the total weight of the raw seed. In another embodiment, the water-swellable polymer; one or more controlled-release fertilizers; bone meal comprising low protein and fat content; or optionally one or more fungicides, which may be used to coat the seeds, have a particle size distribution below about 50, 60, 70, 80, 90, 100, 150 microns. In another embodiment, these materials have a particle size distribution below 106 microns; in another embodiment, below 74 microns.

The coated seeds may be handled, transported, stored and distributed in the manner of uncoated seeds. Likewise, they may be sown and watered in the same manner as uncoated seeds as well, using conventional equipment. Typically, the embodiments of the present invention are applicable to grass and crops to be grown in soil, although it may be applied to other plants and growing media without departing from the scope of the invention. It has been found that the seed treatment of the embodiments of the present invention can impart long-lasting desired effects of the active ingredient to the seed and resulting plant.

EXAMPLES

Having now generally described the invention, the same will be more readily understood by reference to the following examples, which are provided by way of illustration and are not intended as limiting. It is understood that various modifications and changes can be made to the herein disclosed exemplary embodiments without departing from the spirit and scope of the invention.

Example 1

Manufacturing Process Description

Individual material components enter the seed coating system according to FIG. 1. Raw seeds entering the coater, are spun in a horizontal circular motion upon which time the seeds are treated with a fungicide; then a liquid binding adhesive is applied to adhere the powdered additives (e.g., limestone), nutrients, and adsorbent components. Once discharged from the coater, the coated seeds are conveyed through a heated-air drying system to remove excess moisture gained through the coating process. Coated seeds are conveyed through an ambient-air dryer which removes remaining excess moisture and cools seeds to ambient temperature. The coated seeds pass through a series of screens in order to remove over-sized particles or clumps, as well as undersized particles or fines. Coated seeds exit the seed coating system into bags or bulk sacks/tote. The coated seeds are transferred from bulk sacks/totes into final label packaging for shipping.

Example 2

Greenhouse Trial

Two greenhouse trials were established in 22"×28"×3" (L×W×H) wood boxes filled with fine mason sand. The sand was calcareous in nature with a pH of 8.2, a CEC value of 10 and 0.6% organic matter. The sand contained low levels of total nitrogen and phosphorus and an adequate concentration of potassium, calcium, sulfur and iron. Each box was split into 4 equal parts measuring 11"×14". Four treatments were randomly applied to four individual quadrants of each box, with a total of 3 boxes (replications) for each trial. The sand growing medium was inoculated with *Pythium* spp by sprinkling a fine layer of field soil on the sand surface known to contain *Pythium* spores. The seed treatments were applied using Scott's recommended label grass seed product application rates for each species. Compared to raw seed, the coated seed application rate of each species was doubled to compensate for the 50% coating build to ensure a similar number of seeds were sown in both coated and raw seed treatments. After planting, the seed was raked into the sand surface and the plots were watered daily to promote germination and to encourage *Pythium* infection.

Plant height measurements were made beginning 14 days after planting (dap). Measurements on seedling growth and development were made beginning 28 dap. On 28 dap, 10 seedlings were randomly removed from each plot and both a stem diameter (mm) and dry shoot weight (g) were taken. Plot density was measured at 28 dap on a 1-9 scale with 9 representing a thick stand of grass and a rating of 1 where no seedlings are present. Chlorophyll measurements were taken during the trial period using the hand-held Spectrum CM 1000 chlorophyll meter (Spectrum Technologies, Inc., Plainfield, Ill.). The meter uses ambient and reflected 700 nm and 840 nm light to provide a relative chlorophyll index rating between 0 and 999. In general, the higher the chlorophyll index rating the more 'green' the turfgrass stand. At 28 dap, plots were rated for disease incidence. A single 4" core was removed from the center of each plot at the end of the trial (34 dap) and the growing medium was washed from the plant roots. The roots were separated from the shoot tissue and both shoots and roots were placed in individual paper bags and dried at 70° C. for 48 hr to provide dry shoot and root weights. All data were organized and analyzed at the P≤0.05 confidence interval using Agriculture Research Manager (ARM 8.3.1) software (Gylling data management).

Results: GH Trial #1—Sun & Shade Mix Trial

Figure 2:
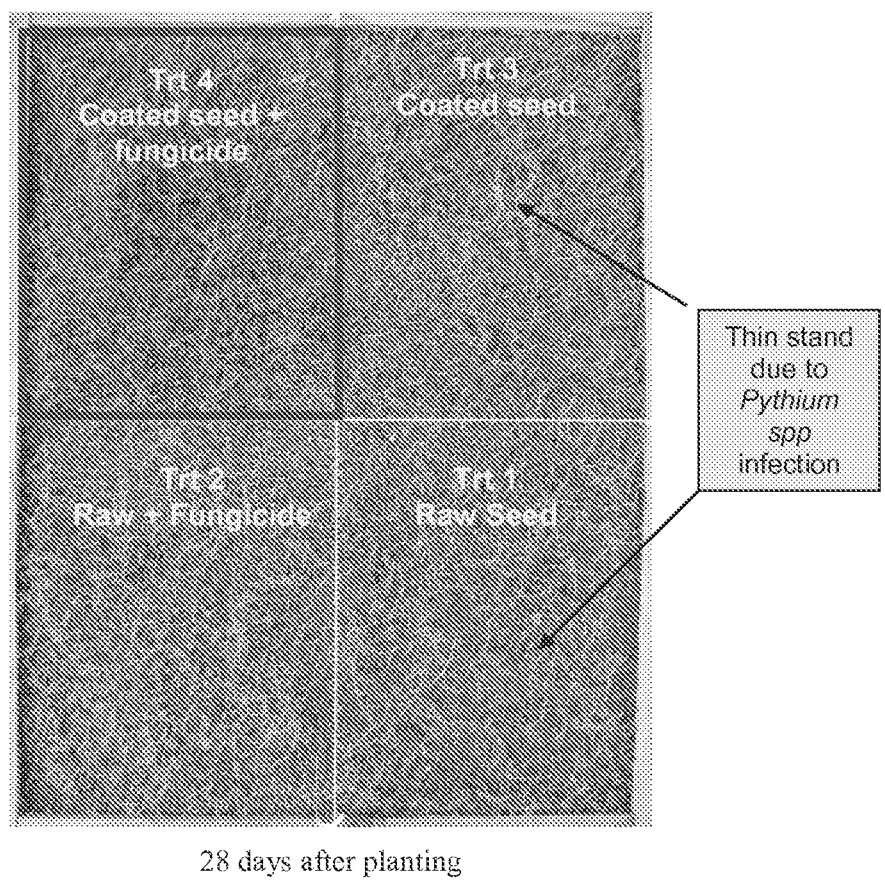
FIG. 2: Greenhouse trial results comprising a coated seed comprising bone meal to control raw seeds (sun and shade mix).
Figure 3:
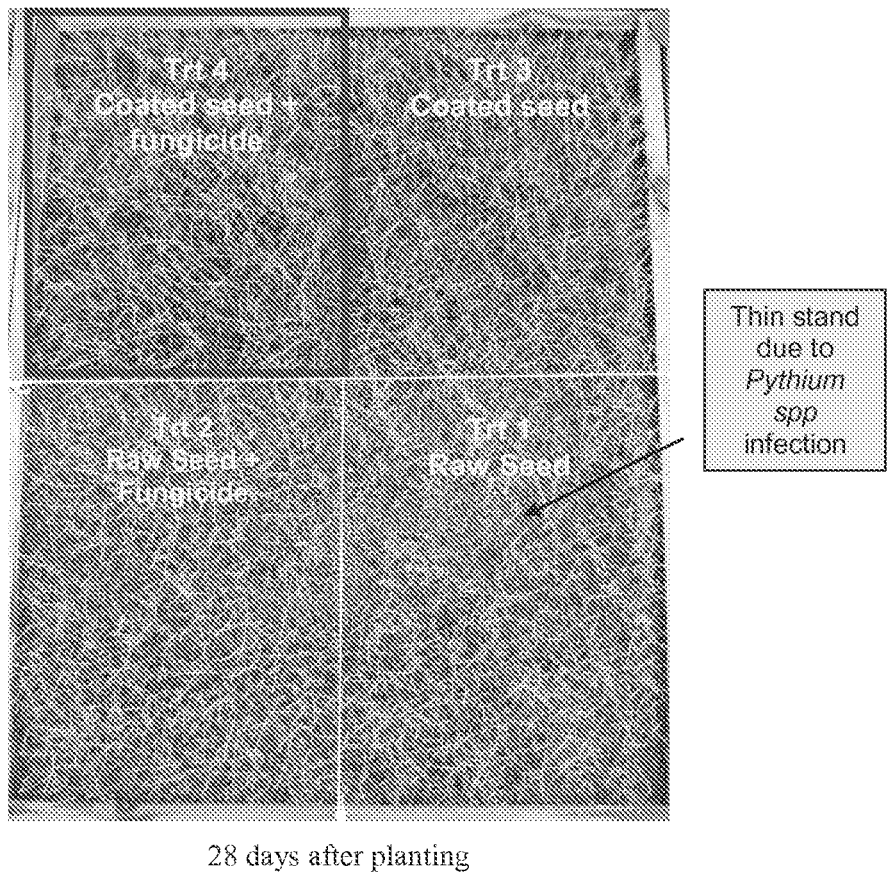
FIG. 3: Greenhouse trial results comparing a coated seed comprising bone meal to control seeds (tall fescue-bluegrass mix).
Figure 4:
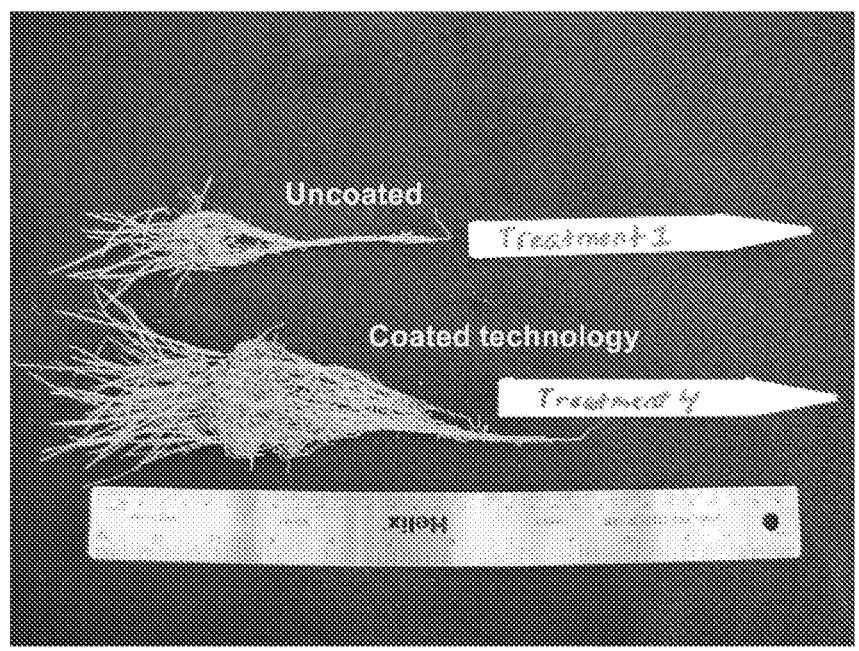
FIG. 4: Comparison of roots between coated seed and control seed at 34 days (tall fescue-bluegrass mix).

Trial results for the sun and shade mix are shown in FIG. 2. Plant height measurements taken at 15 and 28 dap showed plants grown from seeds coated with a water swellable polymer, a controlled release fertilizer; a bone meal comprising low protein and fat content; and a fungicide at 1.28 fl oz/100# seed (Trt 4) to have 21 and 40%, respectively, more vertical growth than plants from the raw (uncoated) seed control (Trt 1). Although treatments at 22 dap were not significant at P=0.05, plant stem diameter in treatment 4 was 1.4× bigger than the diameter of plants in the raw seed control. At 28 dap, plants grown from Trt 4 had a 2.1× larger stem diameter compared to uncoated seed. The dry weight of 10 seedlings grown from Trt 4 at 22 and 28 dap was 1.7× and 1.8× higher, respectively, than plants in the raw seed control. The combined total dry weight of roots and shoots from a 4" core pulled from Trt 4 was 113% higher than the combined dry weight of shoots and roots in the raw seed control. Tiller counts on 10 seedlings at 22 and 28 dap, density assessment at 28 dap and total seedling counts made on the 4" core at 34 dap document the ability of the seed coated with Trt 4 to jumpstart growth through enhanced maturity and improved density of the plot. A disease rating made at 28 dap demonstrates the ability of the Trt 4 treatment in the coated seed to protect seedlings from disease to help ensure early seeding success. The chlorophyll measurements taken during the trial show on average across all rating dates 58% higher index readings on Trt 4 coated seeds compared to the raw (uncoated) control, documenting significantly greener plants.

Results: GH Trial #2—(Tall Fescue-Bluegrass Mix)

Plant height measurements taken at 14, 28 and 34 dap showed plants grown from seeds (tall fescue-bluegrass mix) coated with a water-swellable polymer, a controlled-release fertilizer; a bone meal comprising low protein and fat content; and a fungicide at 1.28 fl oz/100# seed (Trt 4) to have 22%, 43% and 61%, respectively, more vertical growth than plants grown from raw (uncoated) seed with no fungicide treatment. Plants grown from Trt 4 coated seeds had 43% larger stem diameter compared to uncoated seed with no fungicide (Trt 1). The dry weight of 10 seedlings grown from Trt 4 coated seed at 28 dap was 1.9× higher than seedlings in the raw seed control (Trt 1). The combined total dry weight of roots and shoots from a 4" core pulled from Trt 4 coated seeds was 2.4× greater than seedlings in the raw seed control (Trt 1). Trt 4 and Trt 3 (seeds (tall fescue-bluegrass mix) coated with a water-swellable polymer, a controlled-release fertilizer; and a bone meal comprising low protein and fat content) the coated plots had significantly higher density ratings than those containing uncoated seed treatments. These plant measurements document the ability of the coatings on the seed to help jumpstart growth through enhanced maturity and improved density of the plot. The disease rating made at 28 dap demonstrates the ability of the fungicide component of the Trt 4 coating on the seed to help protect seedlings from disease and to help ensure early seeding success. The chlorophyll measurements taken during the trial show on 77% higher index readings on coated seed compared to the raw seed control, documenting significantly greener plants.

It is to be understood that the above-described compositions and modes of application are only illustrative of preferred embodiments of the present invention. Numerous modifications and alternative arrangements may be devised by those skilled in the art without departing from the spirit and scope of the present invention. The appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

Patents, patent applications, publications, product descriptions, and protocols cited throughout this application are incorporated herein by reference in their entireties for all purposes.

I claim:

1. A seed comprising a coating, wherein said coating comprises:
   (a) a water-swellable polymer;
   (b) one or more controlled-release fertilizers; and
   (c) bone meal, wherein the bone meal comprises less than 15% protein content and less than 5% fat content.

2. The seed of claim 1, wherein the water-swellable polymer comprises a cross-linked polyacrylamide polymer; a cross-linked polyacrylate polymer; a cross-linked polyacrylamide/polyacrylate polymer; a polymer resulting from the grafting of acrylonitrile onto saponified starch, or mixtures thereof.

3. The seed of claim 1, wherein the water-swellable polymer comprises carrageenan, agar, alginic acid, gellan gum, or mixtures thereof.

4. The seed of claim 1, wherein the one or more controlled-release fertilizers comprise a compound of the formula:

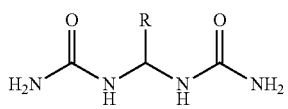

wherein R is hydrogen or alkyl.

5. The seed of claim 4, wherein R is alkyl.

6. The seed of claim 5, wherein R is iso-propyl.

7. The seed of claim 1, wherein the one or more controlled-release fertilizers comprise a methylene-urea polymer of the formula:

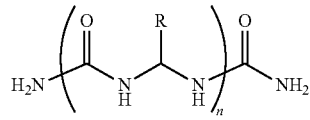

wherein R is hydrogen or alkyl and n is an integer from 2 to 10.

8. The seed of claim 7, wherein R is hydrogen.

9. The seed of claim 1, wherein the bone meal has an N-P-K analysis where the phosphorus content is at least 30.

10. The seed of claim 1, wherein the bone meal has an N-P-K analysis of 1-30-0.

11. The seed of claim 1, wherein the bone meal is porcine bone meal.

12. The seed of claim 1, further comprising at least one fungicide.

13. A method of coating a seed comprising:
    (d) coating seeds with a sticking agent; and
    (e) adding to the seeds coated with the sticking agent one or more controlled-release fertilizers; and bone meal; wherein the bone meal comprises a protein content of less than 15% and a fat content of less than 5%.

14. The method of claim 13, wherein the method further comprises a drying step following step (b).

15. The method of claim 13, wherein the one or more controlled-release fertilizers and bone meal are added in series.

16. The method of claim 13, wherein the one or more controlled-release fertilizers are mixed with the bone meal.

17. The method of claim 13, wherein the sticking agent comprises polyvinyl alcohol, polyethylene glycol or mixtures thereof.

18. The method of claim 17, wherein the sticking agent further comprises water.

19. The method of claim 13, wherein the bone meal comprises a protein content of about 10% and a fat content of about 2.5%.

20. The method of claim 13, further comprising adding at least one fungicide.

21. The method of claim 13, further comprising adding an intermediate layer before the addition of the fertilizer.

22. The method of claim 21, wherein the intermediate layer comprises silicaceous materials, calcium carbonate, talc, or combinations thereof.

23. The seed of claim 1, wherein the bone meal comprises a protein content of about 10% and a fat content of about 2.5%.

24. The seed of claim 1, wherein the seed comprises an intermediate layer between the seed and the fertilizer.

25. The seed of claim 24, wherein the intermediate layer comprises silicacous silicaceous material, calcium carbonate, talc, or combinations thereof.